United States Patent
Tanneberger et al.

(10) Patent No.: US 9,193,270 B2
(45) Date of Patent: Nov. 24, 2015

(54) CHARGING INTERFACE FOR AN ELECTRIC VEHICLE

(75) Inventors: Volkmar Tanneberger, Meine (DE); Ralf Milke, Erkerode (DE); Sven Patuschka, Braunschweig (DE); Klaus Lange, Braunschweig (DE); Andreas Boy, Wolfsburg (DE); Oliver Burnus, Gross Oesingen (DE); Torsten Idczak, Jembke (DE)

(73) Assignee: VOLKSWAGEN AG, Wolfsburg (DE)

( * ) Notice: Subject to any disclaimer, the term of this patent is extended or adjusted under 35 U.S.C. 154(b) by 201 days.

(21) Appl. No.: 13/883,709

(22) PCT Filed: Nov. 28, 2011

(86) PCT No.: PCT/EP2011/005958
§ 371 (c)(1),
(2), (4) Date: Jun. 21, 2013

(87) PCT Pub. No.: WO2012/072227
PCT Pub. Date: Jun. 7, 2012

(65) Prior Publication Data
US 2013/0271079 A1    Oct. 17, 2013

(30) Foreign Application Priority Data

Dec. 1, 2010 (DE) .......................... 10 2010 053 137

(51) Int. Cl.
*H02J 7/00*     (2006.01)
*B60L 11/18*    (2006.01)

(52) U.S. Cl.
CPC ......... *B60L 11/1809* (2013.01); *B60L 11/1818* (2013.01); *Y02T 10/7005* (2013.01); *Y02T 90/14* (2013.01)

(58) Field of Classification Search
CPC ... Y02T 90/14; Y02T 10/7005; Y02T 90/128; Y02T 10/7088; Y02T 90/163
USPC .......................................................... 320/109
See application file for complete search history.

(56) References Cited

U.S. PATENT DOCUMENTS

| | | | |
|---|---|---|---|
| 5,498,948 A * | 3/1996 | Bruni et al. .................... | 320/108 |
| 2010/0013433 A1* | 1/2010 | Baxter et al. .................. | 320/109 |
| 2010/0026238 A1* | 2/2010 | Suzuki et al. ................. | 320/109 |
| 2010/0038156 A1* | 2/2010 | Fujitake et al. ............ | 180/65.22 |
| 2010/0246198 A1* | 9/2010 | Hook et al. .................... | 362/459 |
| 2011/0043355 A1* | 2/2011 | Chander et al. ............... | 340/455 |

(Continued)

FOREIGN PATENT DOCUMENTS

| DE | 19642687 A1 | 4/1998 |
|---|---|---|
| DE | 20120114 U1 | 3/2002 |

(Continued)

OTHER PUBLICATIONS

Search Report for International Patent Application No. PCT/EP2011/005958; Nov. 29, 2012.

*Primary Examiner* — Arun Williams
(74) *Attorney, Agent, or Firm* — Barnes & Thornburg LLP (57) ABSTRACT

A charging interface for a motor vehicle, in particular, an electric vehicle, for charging the traction battery, having a charging socket arranged in a vehicle body opening and a closure device for covering the vehicle body opening, the charging socket can be moved in the axial direction of the vehicle body opening and the charging socket is made to move as a result of the closure device being opened.

10 Claims, 6 Drawing Sheets

(56) References Cited

U.S. PATENT DOCUMENTS

| | | | |
|---|---|---|---|
| 2011/0227531 A1* | 9/2011 | Rajakaruna | 320/109 |
| 2012/0019206 A1* | 1/2012 | Sekido et al. | 320/109 |
| 2012/0049792 A1* | 3/2012 | Crombez | 320/109 |

FOREIGN PATENT DOCUMENTS

| | | |
|---|---|---|
| DE | 102007002025 A1 | 7/2008 |
| GB | 2458754 A | 10/2009 |
| JP | 2000139030 A | 5/2000 |
| JP | 2008162543 A | 7/2008 |
| JP | 2009087759 A | 4/2009 |
| JP | 2009112076 A | 5/2009 |
| JP | 2009146711 A | 7/2009 |
| JP | 2009247176 A | 10/2009 |
| JP | 2010166756 A | 7/2010 |
| WO | 9506970 A1 | 3/1995 |

* cited by examiner

CHARGING INTERFACE FOR AN ELECTRIC VEHICLE

PRIORITY CLAIM

This patent application is a U.S. National Phase of International Patent Application No. PCT/EP2011/005958, filed 28 Nov. 2011, which claims priority to German Patent Application No. 10 2010 053 137.5, filed 1 Dec. 2010, the disclosures of which are incorporated herein by reference in their entirety.

FIELD

Disclosed embodiments relate to a charging interface for a motor vehicle, in particular an electric vehicle, as claimed in the preamble of claims 1, 5 and 7 as well as an electric vehicle having such a charging interface as claimed in the preamble of claim 9.

BACKGROUND

In an electric vehicle, for charging a traction battery installed in the vehicle, the vehicle is connected to an external power supply via a power cable, wherein the charging process takes a considerable length of time. In an electric vehicle provided with a generator, it may also be necessary from time to time to connect the vehicle to an external power source for charging the battery.

Such a charging interface is disclosed, for example, in DE 10 2007 002 025 A1 for a vehicle having an electromotive drive, in which a vehicle body opening is provided, the vehicle body opening being accessible from the vehicle body and being able to be closed by a cover in which a charging socket is arranged instead of a filler neck.

A charging interface having a locking device is disclosed in DE 196 42 687 A1, by which a charging plug inserted into the charging socket is able to be locked against removal. The locking action exerted by the locking device may in this case be performed by a pivoting cover which in the closed position serves at the same time to cover the charging socket. Alternatively, the locking device may exert a locking action directly on the inserted charging plug, wherein the locking device is used at the same time for locking the pivoting cover in the closed position. More specifically, the known pivoting cover provides a certain degree of protection against rain and snow during the long charging time but is not entirely sufficient for this protection.

SUMMARY

Disclosed embodiments, therefore, improve the protection against the weather of a charging interface of a motor vehicle, in particular, an electric vehicle.

Disclosed embodiments provide a charging interface for a motor vehicle as well as a motor vehicle having a traction battery and a charging interface.

BRIEF DESCRIPTION OF THE DRAWINGS

Disclosed embodiments are described hereinafter with reference to the drawings, in which.

DETAILED DESCRIPTION OF THE DISCLOSED EMBODIMENTS

In a first disclosed embodiment of the charging interface for a motor vehicle, in particular, an electric vehicle, for charging the traction battery, comprising a charging socket arranged in a vehicle body opening and a closure device covering the vehicle body opening, the charging socket is displaceable in the axial direction of the vehicle body opening and opening the closure device brings about a displacement of the charging socket. As a result, the charging socket of the charging device is protected against external influences.

For displacing the charging socket, the closure device may be mechanically coupled to the charging socket. Other types of coupling are naturally possible and opening the closure device is able to bring about an activation of an actuator which displaces the charging socket in an appropriate manner.

Optionally, the charging socket is arranged in a receiving device extending into the vehicle interior and opening the closure device brings about a displacement of the charging socket in the direction of the vehicle body surface, whereby an insertion of a charging plug is permitted. Closing the closure device again brings about a movement of the charging socket with the charging plug connected thereto into the interior of the receiving device, in other words into the protected charging position. Optionally, the closure device has a recess for receiving the charging cable of the charging plug in the closed state. The charging process of the battery which takes a considerable time may thus be carried out in an environment which is protected against the weather and external damage.

In a further disclosed embodiment, the charging interface comprises a folding bellows which in the open state of the closure device of the charging interface is pushed over the charging plug in contact therewith. In this case, the charging plug may be arranged in a displaceable or fixed manner. Here, the vehicle is charged in the open state of the charging interface and the charging socket with the inserted charging plug is protected by the folding bellows against the external effects of the weather.

In a further disclosed embodiment of the charging interface for a motor vehicle, in particular, an electric vehicle, for charging the traction battery with a charging socket arranged in a vehicle body opening and a closure device covering the vehicle body opening, the closure device is formed by a closure cover consisting of two closure units, wherein opening the closure device for bringing a charging plug into contact brings about the pivoting of the first closure device out of the vehicle body and the pivoting of the second closure unit into the vehicle body. In particular, the upper closure unit is pivoted out of the vehicle body. In this manner, the charging process which takes a considerable time is protected against the weather and external damage by means of the upper closure unit.

A motor vehicle according to the disclosed embodiments, in particular, an electric vehicle, having a traction battery has one of the charging interfaces set forth above.

Figure 1A:
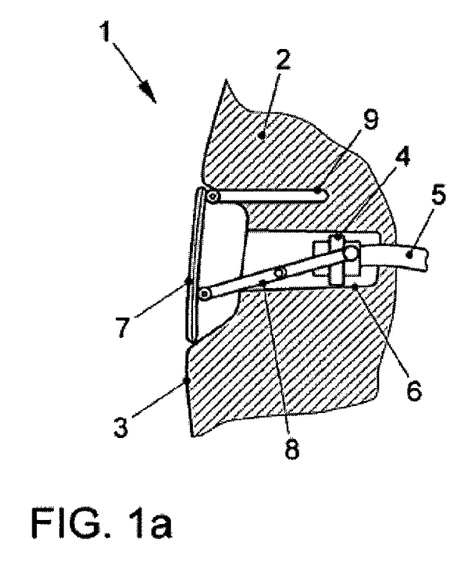
FIG. 1a shows a closed charging interface according to a first disclosed embodiment.

In FIG. 1a, the first disclosed embodiment of the charging interface 1 is shown schematically. The charging interface arranged in the body 2 of a vehicle (not shown) comprises a charging socket 4 having a corresponding internal charging cable 5 for connecting the charging socket 4 to a traction battery (not shown); wherein the charging socket 4 is displaceably arranged in a receiving device 6 extending into the vehicle interior. Moreover, the charging socket 4 is connected by means of a mechanism 8 to a cover 7 acting as a closure device, wherein the cover 7 is flush with the vehicle body surface 3. To this end, the receiving device 6 is widened in the manner of a funnel in the vehicle body region of the cover 7. Moreover, a receiving recess 9 which also extends into the interior of the vehicle body 2 is present for receiving the cover 7.

Figure 1B:
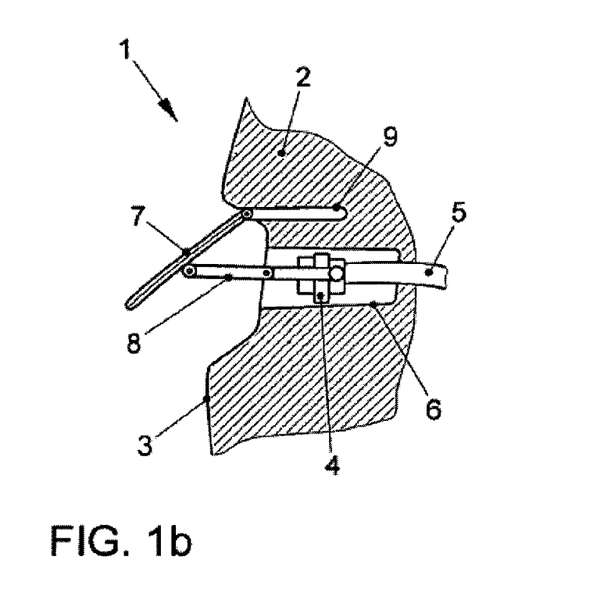
FIG. 1b shows the charging interface of the first embodiment when opening the closure device.

In FIG. 1b, the charging interface 1 is shown during an opening process. By opening the cover 7, the charging socket 4 including the internal charging cable is moved by means of the mechanism 8 inside the receiving device in the direction of the vehicle body surface 3, in other words in this case in the disclosed embodiment the charging socket with the internal charging cable 5 is pulled out of the interior of the receiving device. In FIG. 1b it may be seen that by opening the cover 7, the cover enters the receiving recess 9 thereof.

Figure 1C:
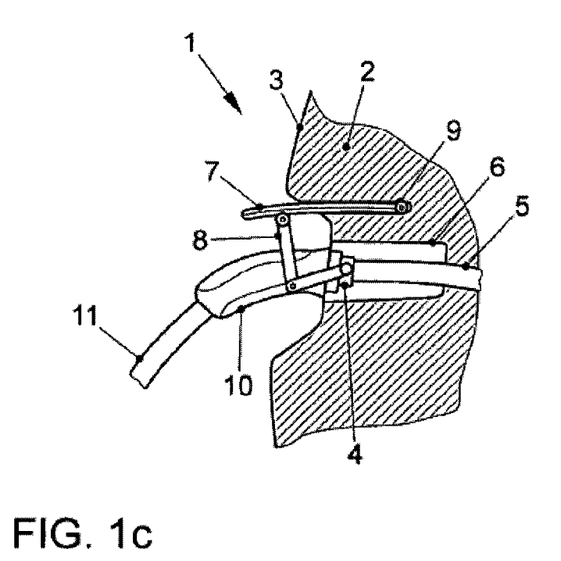
FIG. 1c shows the charging interface of the first embodiment in the open state with the charging plug inserted.

FIG. 1c shows the charging interface 1 in the open state. When the cover 7 is open to a maximum extent, the cover partially retracts into the receiving recess 9 or receiving slot thereof. The mechanism 8 is designed accordingly and provided with a joint. Moreover, the charging socket is pulled out to a maximum extent and may now be connected to a charging plug 10 which has a corresponding external charging cable 11.

Figure 1D:
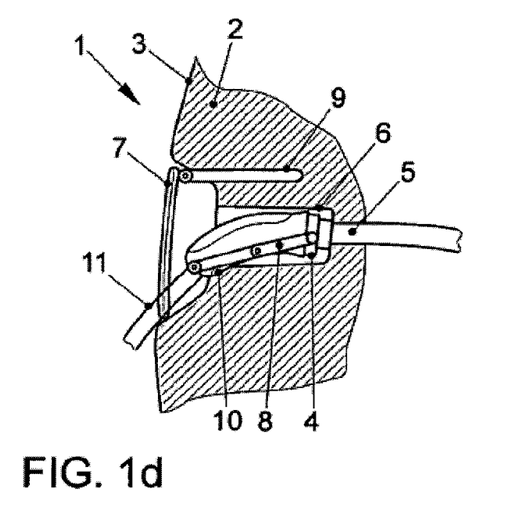
FIG. 1d shows the charging interface of the first embodiment in the open state with the charging plug inserted in the reclosed state.

FIG. 1d finally shows the charging interface 1 during the charging process with the charging plug 10 plugged in. By closing the cover 7 the charging socket 5 with the charging plug connected thereto is again pushed into the receiving device 6 and the cover 7 again terminates flush with the vehicle body surface 3. The external charging cable 11 is guided outwardly and secured through a recess (not shown) in the lower region of the cover 7. By the arrangement of the charging socket 4 and the charging plug 10 connected thereto in the rear region of the receiving device 6, the charging socket and charging plug are protected against external influences. Protection against the weather is also provided, in that water or snow potentially penetrating from outside is able to escape again to the outside in the front funnel-shaped region of the receiving device and not reach the internal region of the receiving device. Moreover, further suitable sealing measures may also be undertaken.

Figure 2A:
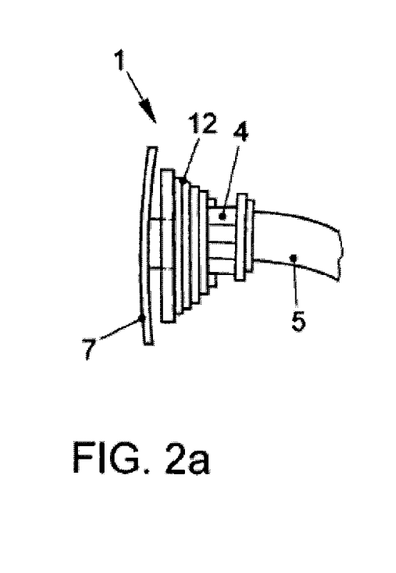
FIG. 2a shows a closed charging interface according to a second disclosed embodiment.

In FIG. 2a further charging interface 1 is shown schematically. In this case, the charging interface 1 comprises a charging socket 4 arranged in a body (not shown) of a vehicle, comprising an internal charging cable 5 as well as a cover 7 arranged in the vehicle body. The charging socket 4 has a folding bellows 12 which is pushed together in the closed state and which may be arranged on the charging socket 4.

Figure 2B:
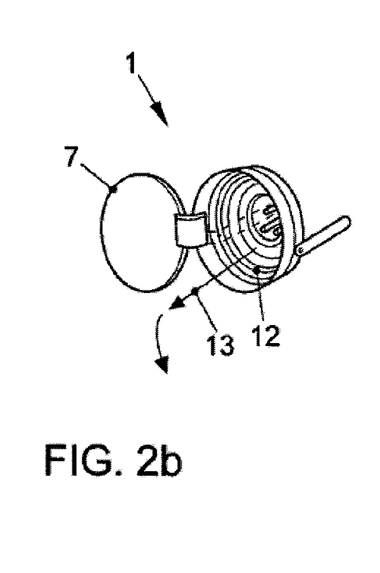
FIG. 2b shows an open charging interface according to the second embodiment.

The charging socket 4 may be pulled out by opening the cover 7 shown in FIG. 2b, as in the first disclosed embodiment. It is also possible for the charging socket 4 to remain stationary. The arrow 13 shows the direction of movement of the folding bellows 12 when the folding bellows is pulled outwardly.

Figure 2C:
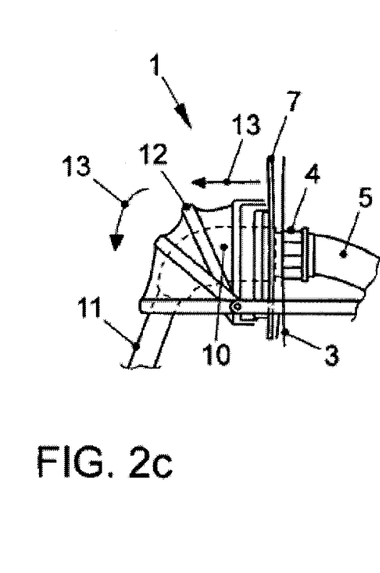
FIG. 2c shows a charging interface according to the second embodiment with the charging plug inserted.

FIG. 2c shows the charging interface 1 in the open state with a charging plug 10 connected to the charging socket 4, with the external charging cable 11 in side view. The folding bellows 12 in this case is pulled out and covers the connection of the charging socket 4 to the inserted charging plug 11, wherein the arrows 13 indicate the direction of withdrawal of the folding bellows 12. In this case, the disclosed embodiment is shown in which the charging socket 4 is pulled out substantially as far as the vehicle body surface 3.

Figure 3A:
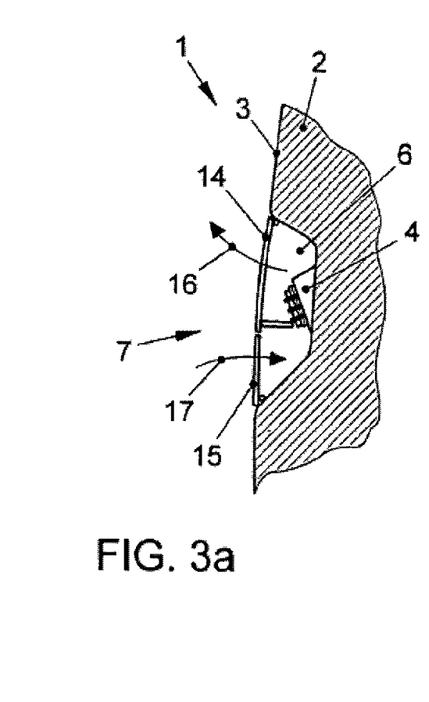
FIG. 3a shows a closed charging interface according to a third disclosed embodiment.
Figure 3B:
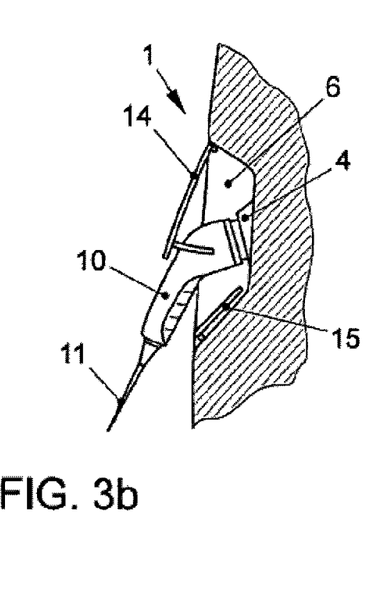
FIG. 3b shows an open charging interface according to the third embodiment with the charging plug inserted.
Figure 3C:
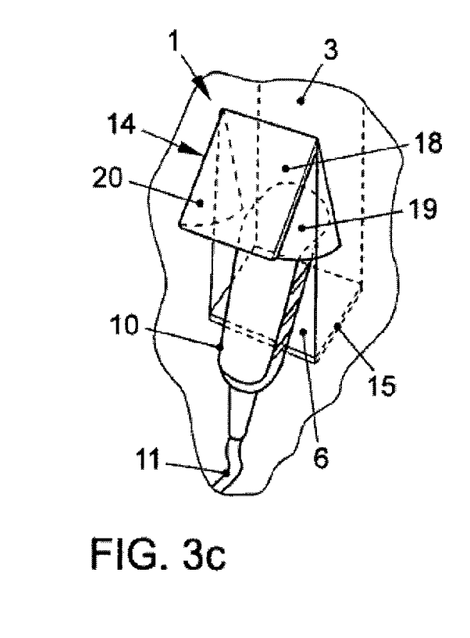
FIG. 3c shows the charging interface of FIG. 3b in plan view.

FIGS. 3a to 3c show a third disclosed embodiment of a charging interface 1. A charging interface 1 with a charging socket 4 is shown in the closed state in a receiving device 6 of the vehicle body 2 in FIG. 3a. The receiving device 6 of the charging socket 4 has a cover 7 which in the closed state terminates flush with the vehicle body surface 3. In this case, the cover 7 is divided into two and consists of an upper cover part 14 and a lower cover part 15 which are movable in different directions, as schematically shown by the directional arrows 16 and 17. In other words, the upper cover part 14 is moved upwardly and outwardly for opening, whilst the lower cover part folds inwardly into the receiving device 6.

FIG. 3b shows the charging interface 1 in the open and/or partially open state with the charging plug 10 having the external charging cable 11 connected to the charging socket 4 during a charging process. In this case, the charging plug 10 is covered by the upper cover part 14 against environmental influences such as rain or snow.

FIG. 3c shows the charging interface of the charging state in a lateral plan view. The upper cover part 14 of the cover 7 consists of a front part 18 as well as two lateral, substantially triangular side parts 19, 20, whereby the charging interface 1 with the inserted charging plug 10 is protected from external weather influences.

LIST OF REFERENCE NUMERALS

1 Charging interface
2 Vehicle body
3 Vehicle body surface
4 Charging socket
5 Internal charging cable
6 Receiving device of charging socket
7 Cover
8 Mechanical connection between cover and charging socket
9 Receiving recess for cover
10 Charging plug
11 External charging cable
12 Folding bellows
13 Direction of movement of folding bellows
14 Upper cover
15 Lower cover
16 Direction of movement of upper cover
17 Direction of movement of lower cover
18 Front part
19 Side part
20 Side part

The invention claimed is:

1. A charging interface for an electric vehicle, for charging a traction battery, the charging interface comprising:
   a charging socket positioned a vehicle body opening and a closure device covering the vehicle body opening, wherein the closure device is flush with a vehicle body surface, wherein the charging socket is moveable in an axial direction of the vehicle body opening, and wherein opening the closure device brings about a movement of the charging socket.

2. The charging interface of claim 1, wherein the closure device is mechanically coupled to the charging socket.

3. The charging interface of claim 1, wherein the charging socket is positioned in a receiving device extending into the vehicle interior, opening the closure device brings about a displacement of the charging socket in the direction of the vehicle body surface and permits an insertion of a charging plug, and closing the closure device results in movement of the charging socket with the charging plug connected thereto into the interior of the receiving device.

4. The charging interface of claim 3, wherein the closure device has a recess for receiving a charging cable of the charging plug in a closed state.

5. The charging interface of claim 1, further comprising, a folding bellows, which, in an open state of the closure device, is pushed over the charging plug in contact therewith.

6. The charging interface of claim 1, wherein the closure device is formed by a cover that covers the vehicle body in a flush manner in a closed state and is displaced during the opening process into a cover receiver positioned in the vehicle body.

7. A charging interface for an electric vehicle, for charging a traction battery, the charging interface comprising:
    a charging socket positioned in a vehicle body opening; and
    a closure device covering the vehicle body opening,
    wherein the closure device is flush with the vehicle body surface,
    wherein the closure device is a closure cover including two disjunct closure parts, wherein opening the closure device to bring a charging plug into contact with the charging socket brings about pivoting of the first closure part out of the vehicle body and pivoting of the second closure part into the vehicle body.

8. The charging interface of claim 7, wherein the first closure part is an upper closure part.

9. An electric vehicle, comprising a traction battery and a charging interface for charging the traction battery, the charging interface comprising:
    a charging socket positioned in a vehicle body opening; and
    a closure device covering the vehicle body opening,
    wherein the closure device is flush with the vehicle body surface,
    wherein the closure device is a closure cover including two disjunct closure parts,
    wherein opening the closure device to bring a charging plug into contact with the charging socket brings about pivoting of the first closure part out of the vehicle body and pivoting of the second closure part into the vehicle body.

10. The electric vehicle of claim 9, wherein pivoting of the second closure part into the body comprises pivoting of the second closure part into the vehicle body opening.

* * * * *